United States Patent Office 2,776,830
Patented Jan. 8, 1957

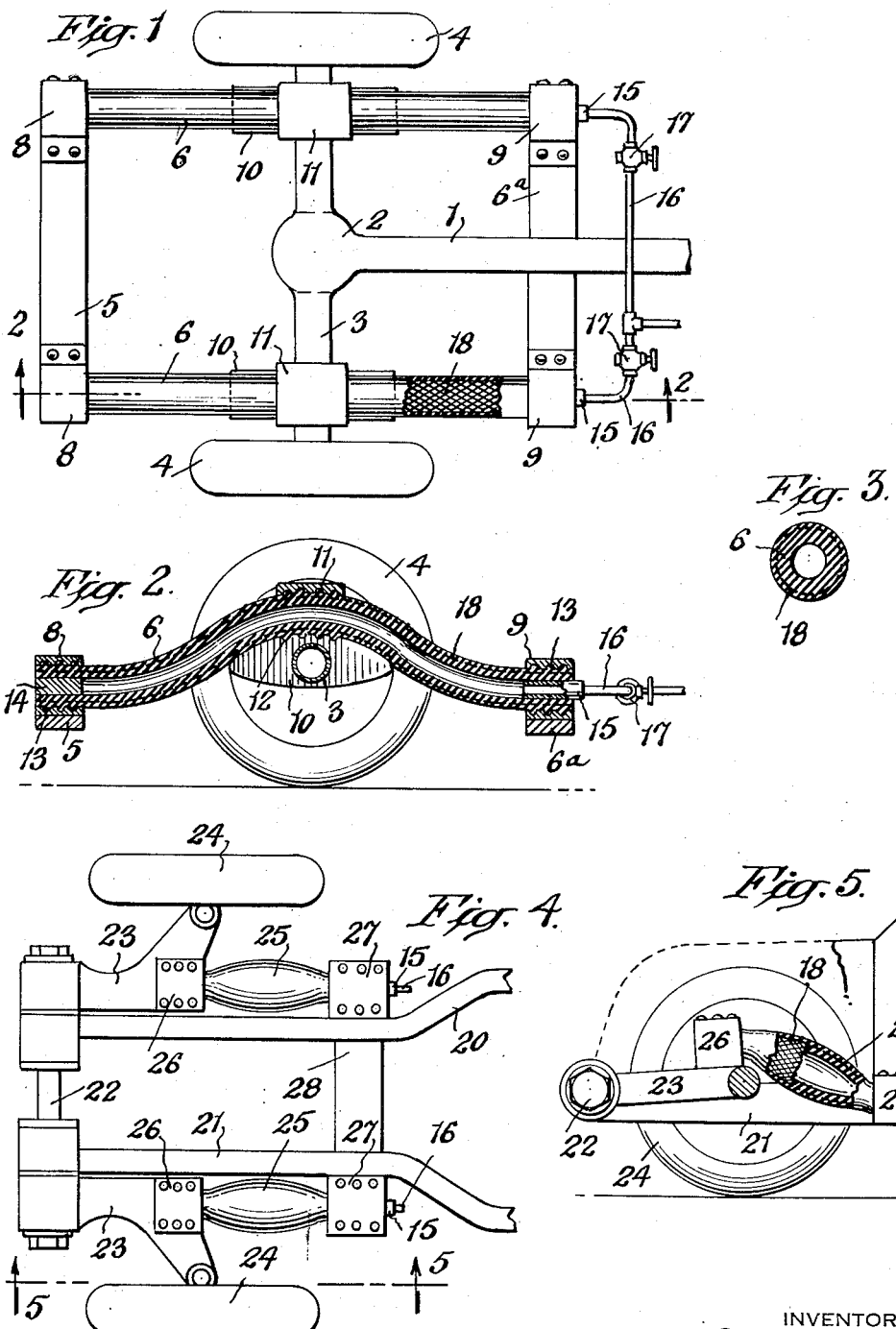

2,776,830

PNEUMATIC SUSPENSION DEVICES FOR VEHICLES

Rene Gouirand, New York, N. Y.

Application October 30, 1953, Serial No. 389,353

2 Claims. (Cl. 267—15)

This invention relates to pneumatic suspensions for vehicles, such as automobiles, trailers, trucks, railway cars and many other wheeled conveyances.

It is an object of the invention to provide a simple and economical pneumatic suspension adapted to support both light and heavy loads with equal facility because of the ability to control the pneumatic pressure employed in the device, to meet the requirement of the imposed load.

It is an object of the invention to provide a pneumatic suspension in which the load is springingly maintained by the employment of elongated extensible air-filled tubes which are both compressible and capable of longitudinal stretch under imposed loads and road shocks to thereby provide a smooth ride under various road conditions and differences in load imposed on the vehicle.

It is another object of the invention to provide a pneumatic suspension capable of application in various ways to different types of wheeled vehicles and which will, under all conditions of service, provide a maximum of resilient support for the imposed loads.

More particularly, the invention contemplates the provision of a resilient supporting element in the form of an elongated, air-filled tube suitably anchored at at least one of its ends and in engagement with the running gear, axle or wheel support in a manner to stretch or elongate under road shocks while pneumatically supporting the load.

With these and other objects to be hereinafter set forth in view, I have devised the arrangement of parts to be described and more particularly pointed out in the claims appended hereto.

In the accompanying drawing, wherein an illustrative embodiment of the invention is disclosed, Fig. 1 is a top plan view of portions of a vehicle provided with the improved suspension;

Fig. 2 is a sectional view, taken substantially on the line 2—2 of Fig. 1, looking in the direction of the arrows;

Fig. 3 is a transverse sectional view through the tubular pneumatic cushion member;

Fig. 4 is a top plan view of portions of a vehicle of a modified construction and to which the improved pneumatic suspension has been applied, and Fig. 5 is a sectional view, taken substantially on the line 5—5 of Fig. 4, looking in the direction of the arrows.

Referring to the drawing, and more particularly to the disclosures of Fig. 1, 1 indicates the drive shaft of a motor vehicle of conventional type. The differential housing is shown at 2 and the rear axle at 3 and to which the wheels 4 are connected in the usual way. These elements are all of known construction. Secured to the side members of the vehicle frame, and which members are omitted from the drawing, are cross members 5 and 6ª which are rigidly secured to the above or to other parts of the frame of the vehicle and thus, for all intents and purposes, form a part of the same.

The improved pneumatic suspension includes the elongated air-inflated tubular cushions or tubes indicated at 6. In the embodiment of the invention shown in Fig. 1, each of the tubes or cushions 6 is secured at its opposite ends by the clamping means 8 and 9 or other suitable anchoring devices, so that each of the cushions or tubes is thus disposed between the frame members 5 and 6ª and extends over the axle 3 of the running gear of the vehicle. The axle is provided adjacent to each of the wheels 4 with a saddle 10 over which the cushion or tube 6 rides, and a cap 11 extends up from the saddle and fits over the top of the tube. The surface of the tube may be knobbed or beaded as indicated at 12 on the surfaces which are disposed on top of the saddle 10 and beneath the cap 11. It can also be knobbed or beaded adjacent to its opposite ends, as indicated at 13, which portions are engaged and firmly held by the clamps 8 and 9. At one end, the cushion or tube 6 is plugged or closed and is thus sealed at this end in any desired manner, such as by the plug 14. The opposite end of the tube is connected to a nipple 15 that is joined to piping or tubing 16 that leads from a source of air under pressure, such as from a tank of compressed air carried by the vehicle. The tubes or cushions 6 are thus filled with air under pressure and to a pressure required according to the load imposed on the vehicle. Valves 17 are provided in the piping 16 to thereby individually control the air pressure in each of the tubes or cushions.

Each of the tubes or cushions 6 is in the form of an elongated hollow or tubular member preferably composed in whole or in part of rubber, or of material of similar characteristics, suitably reinforced. A suggested reinforcement for and means for controlling the extent of longitudinal expansibility of the tube consists of a spirally woven tube formed of wire braid 18 which, because of its spiral weave and plaited arrangement, is expansible and contractible to a limited extent in the manner found in the so-called gripping tube, often referred to as a "Chinese" finger trap. An armored reinforcement of this kind has the advantage of strongly reinforcing the body of the tube or cushion while at the same time it is capable of elongation to a limited extent and contraction to thereby allow expansibility and a certain amount of extensibility to the tube as a whole. Such a reinforcement 18 also maintains the tube in uniform diameter and prevents undue bulge or distortion when under substantial air pressure as when heavy loads are imposed on the vehicle.

The reinforcement 18 is preferably embedded in the body of the cushion or tube and preferably, but not necessarily, near the surface thereof. While this particular type of reinforcement is suggested, it is possible that other types may be used. For example, a coil spring might be embedded in the body of the tube or other reinforcing elements used to permit limited elongation of the tube when necessary but without permitting undue lateral expansion and thus distortion of the tube.

In the embodiment of the invention shown in Figs. 1 and 2, the tubes or cushions 6 are shown as extended or stretched between two frame elements, with the axle engaging under the stretched tubes. It will be apparent that the tube or cushion might extend beneath the axle, or one tube might be arranged to extend above it and one extending below it might also be used to secure a full elliptic spring effect.

In the embodiment of the invention shown in Figs. 4 and 5, the frame members are respectively indicated at 20 and 21 and at the forward end of the frame is a shaft or pivot support 22 on which is pivoted the arms indicated at 23. This is a type of independent suspension for each wheel, the wheels 24 being each carried on a stub axle mounted in each of the brackets or arms 23. In this embodiment of the invention, the cushions or tubes are indicated at 25 and one end of each of the tubes is fixedly attached to one of the arms 23 by a clamp 26. The opposite end of each of the tubes 25 is attached by a clamp 27 to a cross brace 28 on the frame 29. One end of each of the cushions or tubes 25 is closed, plugged or sealed as described in connection with the cushions 6, while the other end is provided with the nipples 15 connected to the tubing 16 in the manner set forth in respect to the structure shown in Figs. 1 and 2. In the embodiment of the invention shown in Figs. 4 and 5, the tubes or cushions 25 are shown as being inflated under substantial air pressure so that some slight distortion is seen. This is not generally necessary for the transportation of normal loads.

From the foregoing the operation of the improved pneumatic suspension will be readily understood. The inflated tube is normally under tension between its points of attachment, namely, the points 8 and 9 of Figs. 1 and 2, and the points 26 and 27 of Figs. 4 and 5. When load is imposed on the vehicle and road shocks occur, further extension of the tube occurs and this extensibility of the tube, coupled with the fact that it is pneumatically inflated, provides easy riding under severe road conditions. The control of the air pressure in the tube enables the tube to be inflated according to load requirements and to meet known road conditions.

Having described a single embodiment of the invention, it is obvious that the same is not to be restricted thereto, but is broad enough to cover all structures coming within the scope of the annexed claims.

What I claim is:

1. In a vehicle, a frame, an arm pivotally secured at one end of the frame, an axle carried by an end of the arm, a wheel supported by the axle, the arm including a clamp situated remotely from the pivotal point of the arm, an elongated air-filled tube having a closed end engaged and held by the clamp, a fixed element secured to the frame and engaging the opposite end of the tube, means entrant at the last-mentioned end of the tube for supplying air within the tube, said tube being capable of longitudinal extension in a direction transverse to the up and down movement of the wheel by pull imposed between the ends of the tube as it traverses a road surface, the tube being reinforced by means which permits expansion of the tube and limits the extent of longitudinal stretch of the same.

2. In a vehicle, a frame, arms pivotally mounted at one end of the frame, a cross member extending across the frame at a point remote from the pivots for the arms, each arm having a free end carrying an axle, a wheel borne by the axle, an elongated, air-filled tube at each side of the frame, each tube having an end fixedly held on the cross member, each tube having an opposite end secured to one of the arms adjacent to the axle, means by which air is supplied within the tubes, the tubes being independently capable of longitudinal extension in a direction transverse to the up and down movement of the wheel by pull imposed between the ends of the tube as it traverses a road surface, the tube being reinforced by means which permits expansion of the tube and limits the extent of longitudinal stretch of the same.

References Cited in the file of this patent
UNITED STATES PATENTS

| | | |
|---|---|---|
| 1,002,448 | Putnam | Sept. 5, 1911 |
| 1,445,970 | O'Connor | Feb. 20, 1923 |
| 2,031,862 | Smith | Feb. 25, 1936 |
| 2,047,971 | Larsen | July 21, 1936 |